No. 861,408.  
PATENTED JULY 30, 1907.

E. B. TOLL.  
DEVICE FOR HOLDING SCISSORS.  
APPLICATION FILED SEPT. 14, 1906.

Edward B. Toll,  
INVENTOR.

WITNESSES:

By C. A. Snow & Co.  
ATTORNEYS

UNITED STATES PATENT OFFICE.

EDWARD B. TOLL, OF BOISE, IDAHO.

DEVICE FOR HOLDING SCISSORS.

No. 861,408.　　　　　Specification of Letters Patent.　　　Patented July 30, 1907.

Application filed September 14, 1906. Serial No. 334,665.

*To all whom it may concern:*

Be it known that I, EDWARD B. TOLL, a citizen of the United States, residing at Boise, in the county of Ada and State of Idaho, have invented a new and useful Device for Holding Scissors, of which the following is a specification.

This invention has relation to devices for holding scissors and it consists in the novel construction and arrangement of its parts as hereinafter shown and described.

The object of the invention is to provide a device for holding scissors or shears while the same are being sharpened.

The device consists primarily of jaws which extend longitudinally of the blade and are adapted to come together and clamp the blade. The inner wall of one jaw is vertically disposed while the inner wall of the opposite jaw is inclined at an angle so that the said jaw may firmly grip the sides of the blade. Each jaw is provided on its outer side with a plate which is attached to its respective jaw by means of set screws passing through vertically disposed perforations. Thus the said plates may be moved vertically with relation to the jaws and will serve as a means for properly bringing the edge of the blade in position against the stone or other grinding means.

Figure 1:
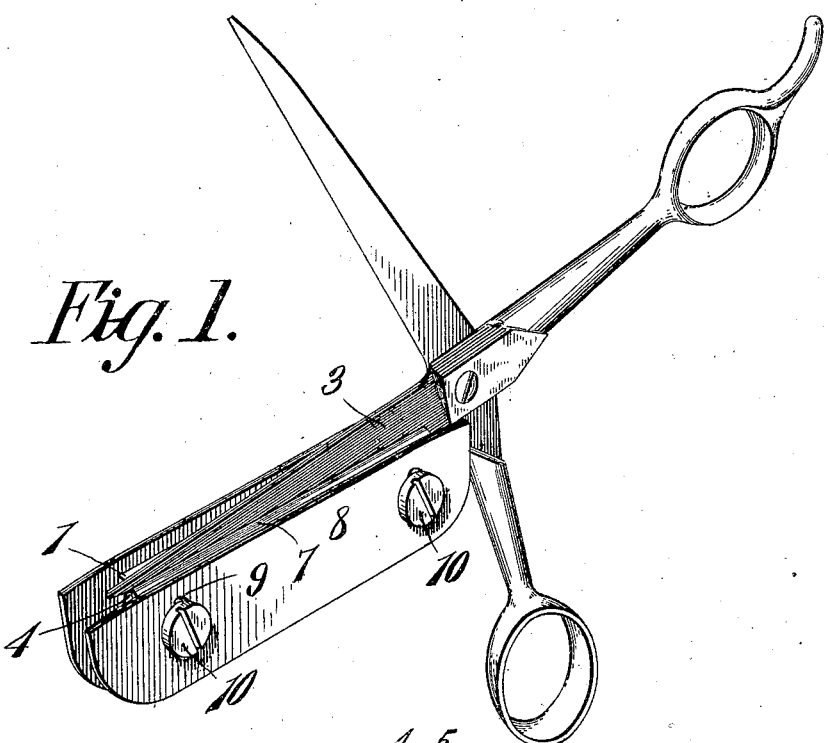
Figure 3:
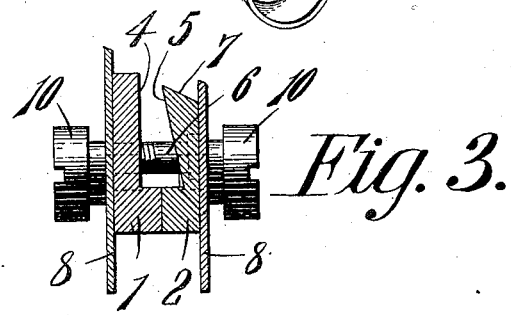
Figure 2:
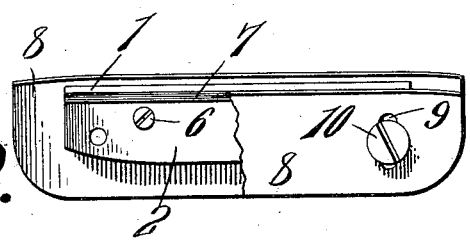

In the accompanying drawing:—Figure 1 is a perspective view of a pair of scissors having the holder applied thereto. Fig. 2 is a side elevation of the holder with parts broken away, and Fig. 3 is a transverse sectional view of the holder.

The holder comprises the jaws 1 and 2 which are adapted to extend longitudinally of the blade 3. The jaw 1 is provided with the inner vertical wall 4 while the jaw 2 is provided with the inner inclined wall 5. The said walls 4 and 5 receive between them the sides of the blade 3 which is clamped in position by means of the clamp screws 6 which pass transversely through the jaws 1 and 2. The upper outer edge of the jaw 2 is chamfered as at 7. The plates 8, 8 are attached to the outer side of the jaws 1 and 2. The said plates are provided with the elongated perforations which are vertically disposed. The set screws 10 pass through the said perforations 9 and enter the threaded perforations provided in the jaws 1 and 2. Thus it is possible to adjust the said plates 8, 8 vertically with relation to the said jaws 1 and 2 and the upper chamfered edges of the said plates 8, 8 serve as guides or limits whereby the operation of the stone or other grinding device is controlled with relation to the edge of the blade 3. Thus the edges of the said plates 8, 8 prevent the stone from grinding off too much of the edge of blade 3 and they also assure the grinding of a straight edge upon the said blade.

Having described my invention what I claim as new and desire to secure by Letters Patent is:—

1. A blade holder comprising jaws one of which is provided with a vertical inner wall and the other with an inclined inner wall, means for holding said jaws together and plates adjustably attached to the outer sides of said jaws.

2. A blade holder comprising jaws one of which is provided with a vertical inner wall and the other with an inclined inner wall, means for holding said jaws together, plates located upon the outer sides of said jaws and being adjustable vertically with relation thereto and means for holding said plates in such adjusted positions.

In testimony that I claim the foregoing as my own, I have hereto affixed my signature in the presence of two witnesses.

EDWARD B. TOLL.

Witnesses:
　E. G. DODDS,
　G. T. HERTLE.